US008239160B2

(12) United States Patent
Lee et al.

(10) Patent No.: US 8,239,160 B2
(45) Date of Patent: *Aug. 7, 2012

(54) ACTIVITY DETECTION IN MEMS ACCELEROMETERS

(75) Inventors: James M. Lee, Northborough, MA (US); John Memishian, Weston, MA (US)

(73) Assignee: Analog Devices, Inc., Norwood, MA (US)

( * ) Notice: Subject to any disclaimer, the term of this patent is extended or adjusted under 35 U.S.C. 154(b) by 353 days.

This patent is subject to a terminal disclaimer.

(21) Appl. No.: 12/408,540

(22) Filed: Mar. 20, 2009

(65) Prior Publication Data

US 2009/0240463 A1     Sep. 24, 2009

Related U.S. Application Data

(60) Provisional application No. 61/038,594, filed on Mar. 21, 2008, provisional application No. 61/049,590, filed on May 1, 2008, provisional application No. 61/078,923, filed on Jul. 8, 2008.

(51) Int. Cl.
*G01P 15/00* (2006.01)
*G01P 21/00* (2006.01)

(52) U.S. Cl. .......................................... 702/141; 73/1.38

(58) Field of Classification Search .................. 702/141, 702/1, 33–35, 81, 84–85, 92, 94–95, 104, 702/127, 150–153, 182–183, 189, 193; 73/1.37–1.38, 1.77, 1.79, 488, 492, 503, 73/503.3, 510–511, 514.01, 514.32

See application file for complete search history.

(56) References Cited

U.S. PATENT DOCUMENTS

| 7,409,291 | B2 * | 8/2008 | Pasolini et al. | ............... 701/220 |
| 2004/0172167 | A1 | 9/2004 | Pasolini et al. | |
| 2008/0016961 | A1 | 1/2008 | Dwyer et al. | |
| 2009/0293615 | A1 * | 12/2009 | Lee | ............ 73/514.01 |

FOREIGN PATENT DOCUMENTS

WO     2006122246 A2     11/2006

OTHER PUBLICATIONS

Bouchaud, J., MEMS Market Brief, iSuppli, May 2009, pp. 1-17.
International Searching Report dated Jul. 3, 2009, 3 pages.

* cited by examiner

*Primary Examiner* — Toan M Le
(74) *Attorney, Agent, or Firm* — Sunstein Kann Murphy & Timbers LLP

(57) ABSTRACT

A method of detecting activity in a MEMS accelerometer captures an acceleration bias, measures acceleration at a predetermined time, calculates a change in acceleration using the measured acceleration and the acceleration bias, and compares the change in acceleration to a threshold to detect activity. A method of detecting inactivity uses a similar technique along with a timer. The method of detecting inactivity in a MEMS accelerometer captures an acceleration bias, measures acceleration at a predetermined time, calculates a change in acceleration using the measured acceleration and the acceleration bias, and compares the change in acceleration to a threshold to detect inactivity. The method further determines if the change in acceleration is less than the threshold and, if so, determines if a predetermined period of time has elapsed to detect inactivity.

20 Claims, 4 Drawing Sheets

ACTIVITY DETECTION IN MEMS ACCELEROMETERS

CROSS-REFERENCE TO RELATED APPLICATIONS

This patent application claims priority to U.S. Provisional Patent Application No. 61/038,594 filed Mar. 21, 2008, entitled ACTIVITY DETECTION IN MEMS ACCELEROMETERS, U.S. Provisional Patent Application No. 61/049,590 filed May 1, 2008, entitled MANAGEMENT SYSTEM AND METHOD FOR MEMS INERTIAL SENSORS, and U.S. Provisional Patent Application No. 61/078,923 filed Jul. 8, 2008, entitled SYSTEM AND METHOD FOR CAPTURING AN EVENT IN MEMS INERTIAL SENSORS, each disclosure of which is incorporated by reference herein in its entirety.

This patent application is also related to U.S. patent application Ser. No. 12/408,536, filed Mar. 20, 2009, entitled MANAGEMENT SYSTEM FOR MEMS INERTIAL SENSORS, U.S. patent application Ser. No. 12/408,532, filed Mar. 20, 2009, entitled SYSTEM AND METHOD FOR CAPTURING AN EVENT IN MEMS INERTIAL SENSORS, which are filed on the same day as the present application, each disclosure of which is incorporated by reference herein in its entirety.

FIELD OF THE INVENTION

The invention generally relates to MEMS accelerometers and, more particularly, the invention relates to detecting activity or inactivity in MEMS accelerometers.

BACKGROUND OF THE INVENTION

A variety of different applications use sensor systems to detect the movement of an underlying object. Sensors employing microelectromechanical systems (MEMS) devices are increasingly used in such applications due to their relatively small size and their capability to detect relatively small changes in the measured item. MEMS devices, such as an accelerometer, typically employ a movable, inertial mass formed with one or more fixed, non-moving structures. For example, in a MEMS accelerometer, the inertial mass may be suspended in a plane above a substrate and movable with respect to the substrate. The movable structure and the fixed structures form a capacitor having a capacitance that changes when the movable structure moves relative to the fixed structures in response to applied forces, such as along a predetermined axis of the device, e.g., x-, y- and z-axes.

Currently, accelerometers may be used for monitoring the interaction of users with electronic devices, such as gaming devices, cell phones, personal digital assistants, etc. The accelerometer in the devices may detect a movement above a particular threshold or a change in orientation. However, accelerometers experience a constant 1 g field due to the earth's gravitational field. This 1 g field is in an arbitrary direction depending upon the orientation of the device. In order to find the actual acceleration of an object (relative to the earth), a 1 g threshold is typically set in the device in order to eliminate the contribution from the earth's gravitational field. This means, however, that a device typically can only detection acceleration greater than 1 g. High pass filters may be used in an attempt to compensate for this shortcoming, but this solution does not detect extremely slow interactions. In some cases, however, users move electronic devices in a slow manner and do not cause greater than a 1 g change. Other problems with monitoring the interaction of users with electronic devices is determining when users stop moving the device. The device may not be placed in a known orientation so detecting inactivity has some similar challenges as detecting movement or activity of the device.

SUMMARY OF THE INVENTION

In accordance with one embodiment of the invention, a method of detecting activity in a MEMS accelerometer captures an acceleration bias, measures acceleration at a predetermined time, calculates a change in acceleration using the measured acceleration and the acceleration bias, and compares the change in acceleration to a threshold to detect activity.

In accordance with another embodiment of the invention, a method of detecting inactivity in a MEMS accelerometer captures an acceleration bias, measures acceleration at a predetermined time, calculates a change in acceleration using the measured acceleration and the acceleration bias, and compares the change in acceleration to a threshold to detect inactivity. The process further determines if the change in acceleration is less than the threshold and, if so, determines if a predetermined period of time has elapsed to detect inactivity.

In some embodiments, the method may further include changing the predetermined time for measuring acceleration when activity or inactivity is detected. The MEMS accelerometer may include at least one measurement axis and measuring acceleration may include measuring acceleration from one or more measurement axes. In addition, or alternatively, the threshold may be a different value for two or more measurement axes or may be the same value for two or more measurement axes. Activity may be detected if the change in acceleration is greater than or equal to the threshold for any measurement axis. In contrast, inactivity is detected if the change in acceleration is less than the threshold for all measurement axes. The method may further include initiating a method of detecting inactivity once activity is detected or vice versa. The threshold for detecting activity may be a different value than the threshold for detecting inactivity for a given measurement axis.

For inactivity detection, if the change in acceleration is greater than or equal to the threshold, the method may further repeat capturing, measuring, calculating and comparing until the change in acceleration is less than the threshold. If the predetermined period of time has not elapsed, the method may further repeat measuring, calculating, comparing, and determining if the change in acceleration is less than the threshold until the predetermined period of time has elapsed or the change in acceleration is greater than or equal to the threshold.

Illustrative embodiments of the invention may be implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Embodiments of the present invention provide a system and method of detecting activity or inactivity in a MEMS accelerometer. For activity detection, the process may capture an acceleration offset or bias upon the start of looking for activity. This bias is taken and stored. The accelerometer may measure a current acceleration at a data rate and compare the measured acceleration to the acceleration bias to look for a difference greater than an activity threshold. For inactivity detection, a similar technique may be used along with a timer. When inactivity detection is desired, the measured acceleration data is compared to the stored acceleration bias. The process continues until the change in acceleration is less than the inactivity threshold for a desired period of time.

Embodiments of the present invention provide a way of monitoring activity and/or inactivity and detecting when it changes, and even in the presence of a constant acceleration such as the earth's 1 g. gravitational field and even when the change in acceleration or orientation is less than 1 g. The activity/inactivity monitoring and detection may be performed by a sensor management system that uses digital logic and state machines. The sensor management system may be coupled with one or more sensors to effectively manage different conditions of a device containing the sensor(s) without interaction with the device's central computer or microprocessor (excluding the sensor's interaction with the microprocessor during its initial configuration). For instance, the inertial sensor does receive some initial input from the microprocessor, such as initial configurations or settings, e.g., threshold values, which may be set manually by a user or automatically. In this way, the sensor management system coordinates the sensor's functions and responds to specific types of detected movement. By embedding the functionality in the sensor management system, benefits may be realized, such as achieving maximal power savings since only the sensor and the sensor management system may need to be powered, rather than the device's microprocessor. Thus, the activity/inactivity monitoring and detection capability may provide efficient management of a MEMS inertial sensor. Details of illustrative embodiments are discussed below.

Figure 1:
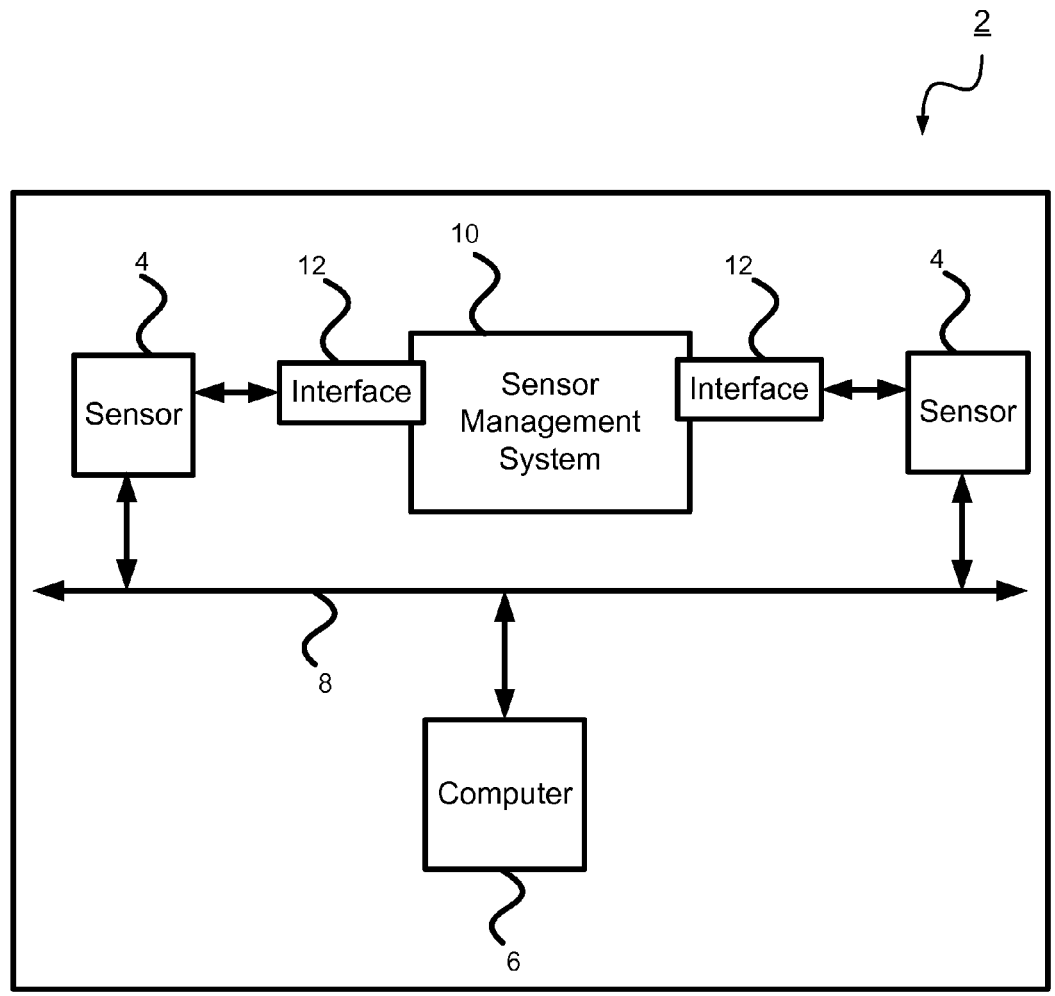
FIG. 1 schematically shows a simplified view of a sensor system in accordance with illustrative embodiments of the invention.

As shown in FIG. 1, various embodiments may include a sensor system 2 having one or more inertial sensors 4 that communicate with a central computer or microprocessor 6 through some interconnection medium 8. The sensor system 2 may also include one or more sensor management systems 10 in communication with the inertial sensor(s) 4. The inertial sensor(s) 4 may produce data values, e.g., motion data related to the detected movement of an object, which may be transmitted to the microprocessor 6 via interconnection 8 and/or the sensor management system 10 through the management system's interface 12, as discussed in more detail below. Although FIG. 1 shows two inertial sensors 4 with one management system 10, one sensor 4 may be used with one or more management systems 10 and/or two or more inertial sensors 4 may be used with one or more management systems 10.

Figure 2:
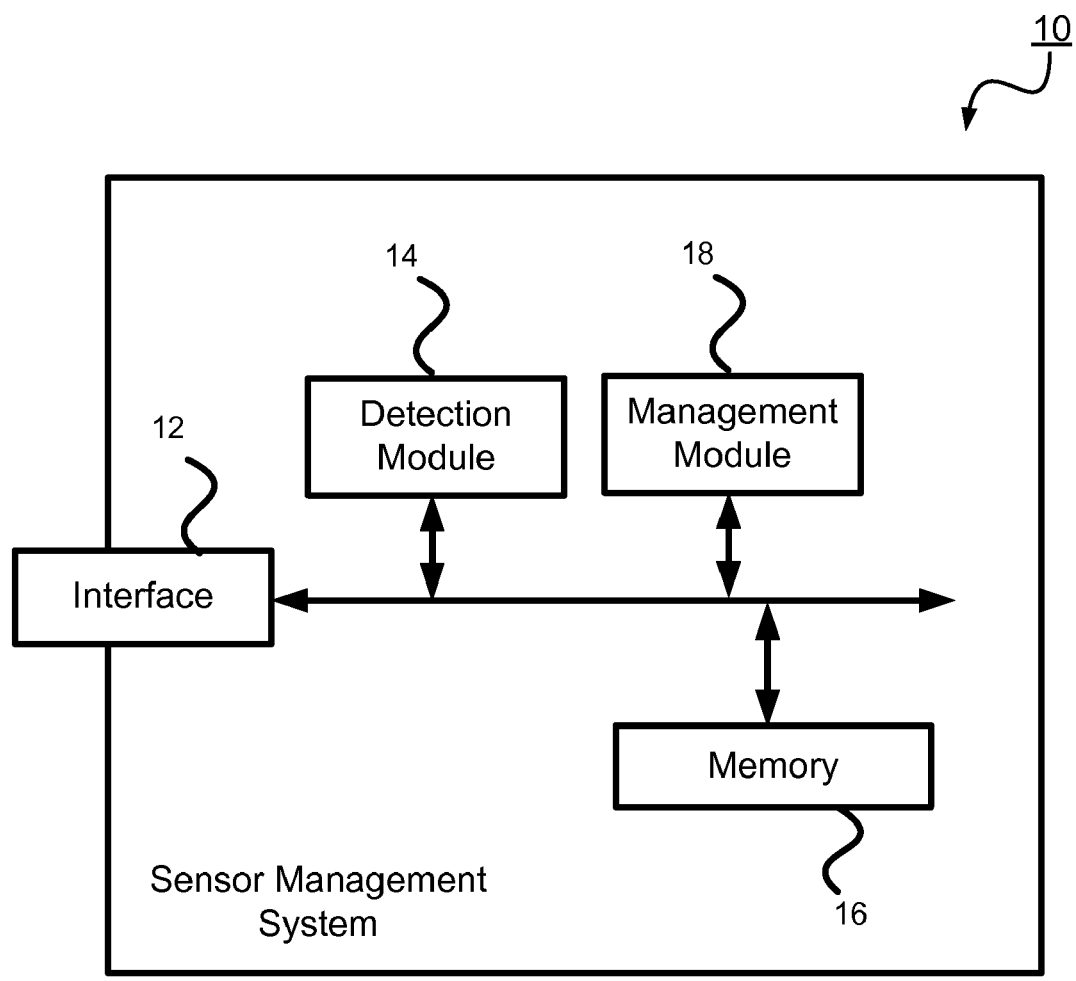
FIG. 2 schematically shows a sensor management system in accordance with illustrative embodiments of the invention.

FIG. 2 schematically shows a block diagram of a sensor management system 10 in accordance with illustrative embodiments of the invention. The sensor management system 10 may include an interface 12 for communicating with external devices, such as the inertial sensor(s) 4 (e.g., for receiving data produced by the sensors and sending data to the sensors) or the microprocessor 6, and a detection module 14 for processing the data values received and monitoring or determining whether activity and/or inactivity has occurred. The sensor management system 10 may also include memory 16 for storing or collecting the data values received from the external device and the data values calculated by the detection module 14.

The sensor management system 10 may also include a management module 18 that may modify the sensor's configuration. Various parameters may be set in the sensor 4 by the management module 18, e.g., parameters may be set based on whether activity or inactivity is detected by the detection module 14. In some embodiments, for example, the rate the acceleration is measured from the accelerometer may vary depending upon whether activity or inactivity is detected. For instance, a more frequent sample rate may be used by the sensor 4 when activity is detected or monitored by the detection module 14 rather than when inactivity is detected or monitored. In addition, or alternatively, the management module 18 may coordinate the functionality of the detection module 14. For example, in some embodiments, it may be desirable to look for activity after inactivity is detected and vise-versa. Thus, the management module 18 may instruct the detection module 14 when to look for activity and/or inactivity. By coordinating the activity detection and inactivity detection functions in the detection module 14, intelligent management of the accelerometer functions may be achieved, e.g., effective automated power management. The functionality of the sensor management system 10 and its detection module 14 are discussed in greater detail below with regard to embodiments of its implementation.

Figure 3:
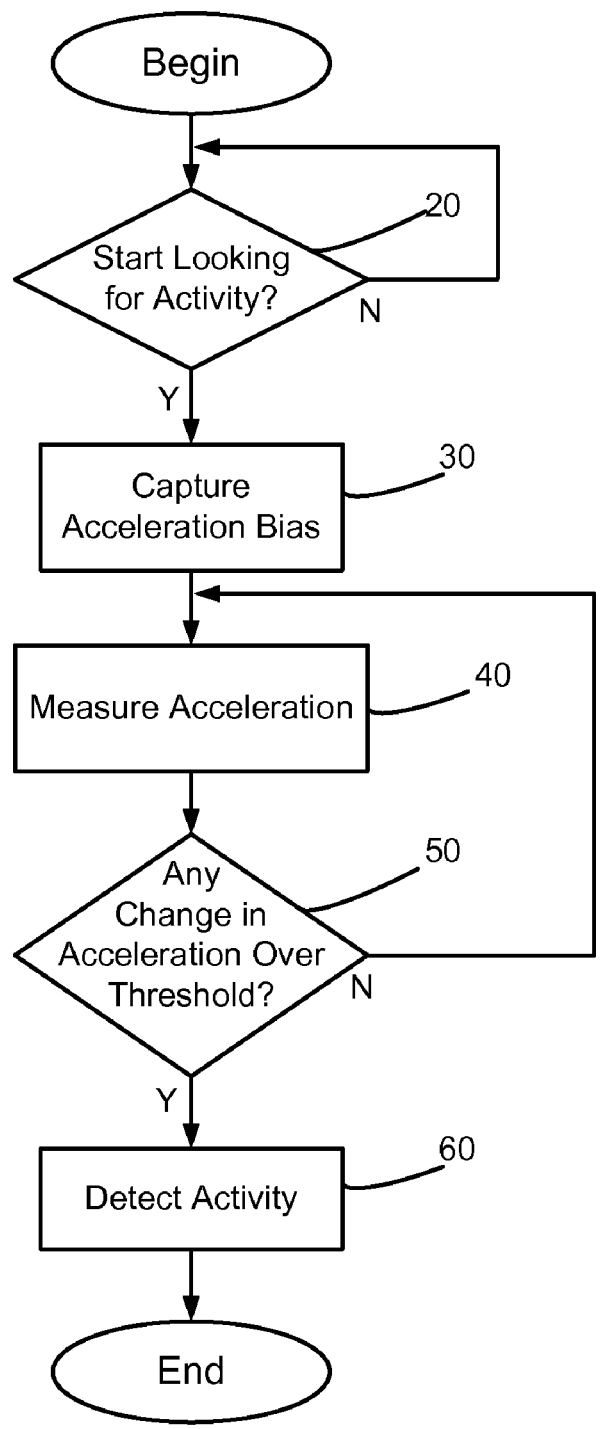
FIG. 3 shows a process of detecting activity in a MEMS accelerometer according to embodiments of the present invention.

FIG. 3 shows a process of detecting activity that may be performed by the sensor management system's 10 detection module 14 according to illustrative embodiments of the present invention. Thus, in some embodiments, the detection module 14 may include a computational component and a comparator (not shown) as discussed further below. The process begins at step 20, which decides whether to start looking for activity. The detection module 14 may start to look for activity automatically at designated times, (e.g., when the device is turned on or at periodic intervals) or manually, (e.g., when the user actively initiates a request such as tapping on a device screen). Alternatively, or in addition, the management module 18 may instruct the detection module 14 to start to look for activity once inactivity is detected (inactivity detection is discussed in greater detail below with regard to FIG. 4).

In step 30, an acceleration offset or bias may be captured upon the start of looking for activity. This may be accomplished by having the detection module 14 capture a snapshot of the current acceleration or orientation of the device and digitally store the value as the acceleration bias in memory 16.

In step 40, the acceleration of the device may be measured by the sensor(s) 4 and the data values stored in memory 16. The acceleration may be measured on one or more axes of the device (e.g., x-, y-, and/or z-axis), which may be determined automatically or manually (e.g., set by the user). The accelerometer may sample the acceleration data at a data rate. The management module 18 may determine the sensor's 4 data rate depending on the current detected state of the device by the detection module 14. For example, the accelerometer sample rate may be set to a desired "awake" mode or more frequent sampling rate when activity is detected or monitored by the detection module 14. Similarly, the accelerometer sample rate may be set to a desired "sleep" mode or more infrequent sampling rate when inactivity is detected/monitored. When the detection module 14 has yet to determine activity and/or inactivity, the management module 18 may set a default value for the sensor's 4 sample rate, e.g., sleep mode sampling rate, awake mode sampling rate, or some other sampling rate, until the detection module 14 determines the current detected state of the device. Although one mode is discussed for when activity or inactivity is detected/monitored, the management module 18 may set two or more different modes during a given state of the device.

In step 50, the detection module 14 calculates the change in acceleration and verifies whether that change is greater than or equal to a threshold. The detection module 14 may determine the change in acceleration by calculating the difference between the current measured acceleration and the digitally stored acceleration bias using a computational component. The detection module 14 may then compare an absolute value of the change in acceleration to a threshold value using a comparator. The detection module 14 performs these calculations and the measured acceleration values, the calculated difference and the threshold value may be stored in the memory 16. The threshold may be set automatically or manually and may be the same or different for different axes. If the change in acceleration is less than the threshold, then the process returns to step 40 where the acceleration may be measured again. If the change in acceleration is greater than or equal to the threshold, then the process proceeds to step 60, where activity is detected. When activity is detected by the detection module 14, it may inform the management module 18 of the current detected state of the device. The management module 18 may then send instructions or parameters to the inertial sensor 4 via the interface 12 as discussed above (e.g., setting sampling rates), and may send instructions back to the detection module 14, e.g., start to look for inactivity. Thus, the detection module 14 may optionally start to look for inactivity once activity is detected.

Figure 4:
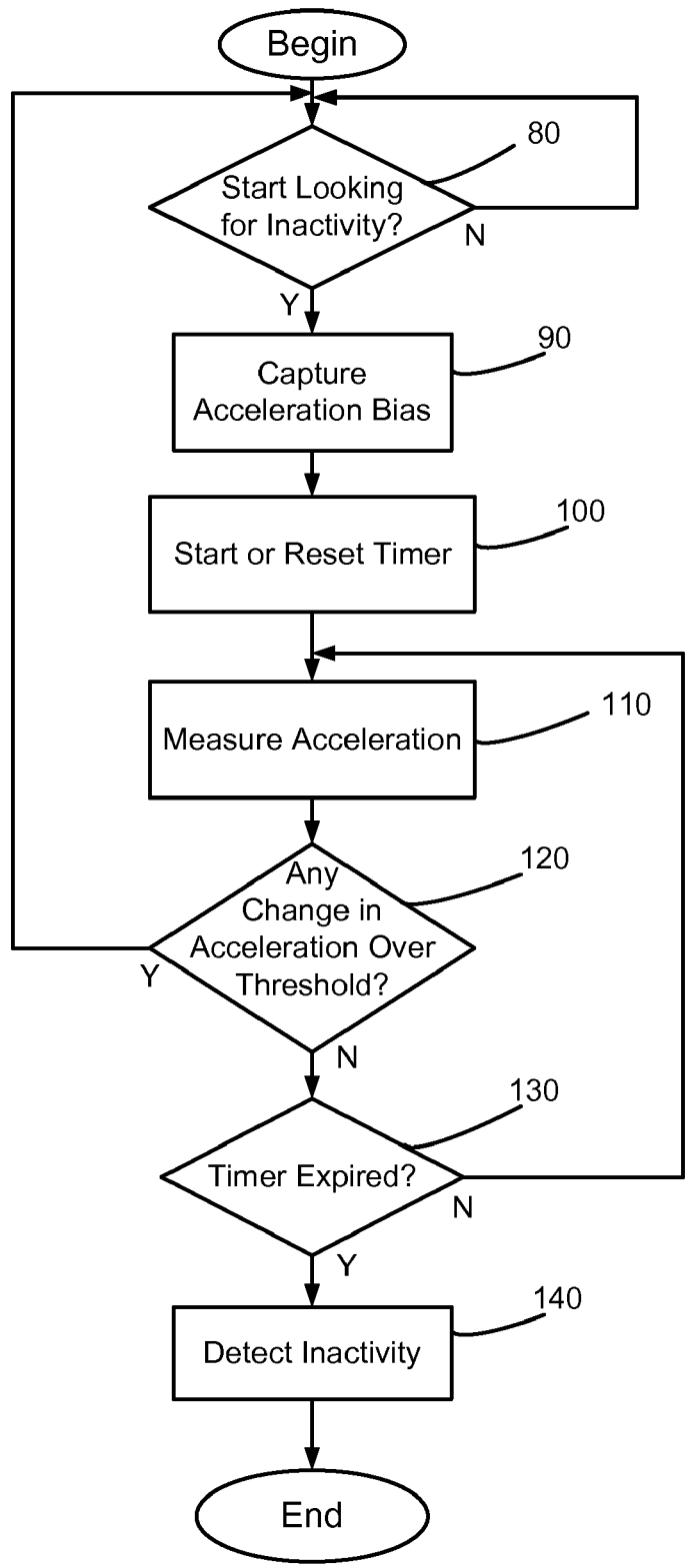
FIG. 4 shows a process of detecting inactivity in a MEMS accelerometer according to embodiments of the present invention.

FIG. 4 shows a process of detecting inactivity that may be performed by the sensor management system's 10 detection module 14 according to illustrative embodiments of the present invention. Inactivity detection is similar to activity detection although a timer may be used. Thus, in some embodiments, the detection module 14 may include a timer along with the computational component and comparator (not shown). The process begins at step 80, which decides whether to start looking for inactivity. The detection module 14 may start to look for inactivity automatically at designated times, (e.g., when the device is turned off or at periodic intervals) or manually, (e.g., when the user actively initiates a request such as tapping on a device screen). Alternatively, or in addition, the management module 18 may instruct the detection module 14 to start to look for inactivity once activity is detected.

In step 90, an acceleration offset or bias may be captured by the detection module 14 upon the start of looking for inactivity. This step is similar to step 30 in the activity detection process described above. In step 100, the detection module's 14 timer may be started or reset. In step 110, the acceleration of the device may be measured, similar to step 40 described above.

In step 120, the detection module 14 calculates the change in acceleration and verifies whether that change is greater than or equal to a threshold, similar to step 50 described above. The threshold may be set automatically or manually and may be the same or different for different axes. The inactivity threshold may also be the same or different than the activity threshold. If the change in acceleration is greater than or equal to the given threshold in any of the measured axes, then the process returns back to step 80. If the change in acceleration is less than the given threshold for all of the measured axes, then the process proceeds to step 130.

In step 130, the detection module 14 verifies whether a predetermined period of time has elapsed, e.g., by determining whether the timer has expired. If the timer has not expired, then the process returns to step 110 and the acceleration may be measured again. If the timer has expired, then the process proceeds to step 140, where inactivity is detected. The predetermined period of time may be set automatically or manually. When inactivity is detected by the detection module 14, it may inform the management module 18 of the current detected state of the device. The management module 18 may then send instructions or parameters to the inertial sensor 4 via the interface 12 as discussed above (e.g., setting sampling rate parameters), and may send instructions back to the detection module 14, e.g., start to look for activity. Thus, the detection module 14 may optionally start to look for activity once inactivity is detected.

As mentioned above, various parameters may be set in the inertial sensor 4 by the management module 18. Although the sampling rate parameter is mentioned above, discussion of a specific parameter is exemplary and not intended to limit the scope of various embodiments of the invention. Other parameters in the inertial sensor(s) 4 may also be set by the management module 18 as known by those skilled in the art. In addition, the management module 18 may set parameters in the detection module 14, the memory 16, and/or the sensor(s) 4.

Although inertial sensors 4 such as accelerometers are discussed above, principles of illustrative embodiments may apply to other inertial sensors or sensor devices, such as MEMS gyroscopes and MEMS pressure sensors or microphones. Accordingly, discussion of inertial sensors is exemplary and not intended to limit the scope of various embodiments of the invention.

Among other implementations, the detection module 14 and the management module 18 may be a single integrated unit having the discussed functionality, and/or a plurality of interconnected, separate functional devices. Reference to a "module" therefore is for convenience and not intended to limit its implementation. Moreover, the various functionalities within the detection module 14 and/or the management module 18 may be implemented in any number of ways, such as by means of one or more application specific integrated circuits or digital signal processors, or the discussed functionality may be implemented in software.

In some embodiments of the present invention, activity and inactivity detection may be determined independently of one another and/or concurrently. In some embodiments, activity detection may be dependent upon detecting inactivity and vise-versa. As mentioned above, the start of looking for activity (step 20) may be based on having detected inactivity and the start of looking for inactivity (step 80) may be triggered by having detected activity. For example, once inactivity is detected, the sample rate of the sensor 4 may be slowed to a "sleep" rate to further reduce power consumption.

The activity and inactivity functions may be embedded in the accelerometer for power control of the end device. This may be accomplished by using digital logic and state machines closely embedded with the accelerometer. Alternatively, the activity and inactivity functions may exist separately and a microprocessor or other controller may configure the sensor to look for activity, inactivity or both.

All or part of the functionality of the sensor management system 10 may be implemented in management circuitry, which may be implemented as part of the sensor-specific circuitry. For example, if the sensor is an accelerometer, then all or part of its functionality may be integrated with the accelerometer or sensor circuitry. The sensor circuitry may detect an acceleration above a particular threshold or a change in orientation and transmit such motion data to other circuitry for further processing. Sensor specific circuitry may be on the same chip or die as the sensor itself, or on a different chip or die. As another example, the sensor specific circuitry may be implemented on an application specific integrated circuit (ASIC), while the sensor may be on a sensor chip with no circuitry (other than pads for wirebonding with the ASIC). Both the ASIC and sensor chip may be within a single package, or in separate packages.

Embodiments may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the method and system. Those skilled in the art should appreciate that such computer instructions may be written in a number of programming languages for use with many computer architectures or operating systems. For example, embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Thus, some embodiments of the invention may be implemented as hardware, software (e.g., a computer program product), or a combination of both software and hardware.

Although the above discussion discloses various exemplary embodiments of the invention, it should be apparent that those skilled in the art can make various modifications that will achieve some of the advantages of the invention without departing from the true scope of the invention.

What is claimed is:

1. A method of detecting activity in a MEMS accelerometer, the method comprising:
using circuitry, storing a first acceleration value as measured by the accelerometer in a memory at a first time;
then measuring a second acceleration value with the accelerometer at a predetermined time, the predetermined time later than the first time;
using circuitry, calculating a change in acceleration equal to the difference between the second acceleration value and the stored first acceleration value from the memory; and
using circuitry, comparing the change in acceleration to a threshold to detect activity.

2. The method of claim 1, further comprising:
changing the predetermined time for measuring acceleration when activity is detected.

3. The method of claim 1, wherein the MEMS accelerometer includes at least one measurement axis and measuring acceleration includes measuring acceleration from one or more measurement axes.

4. The method of claim 1, wherein the MEMS accelerometer includes at least one measurement axis and the threshold is a different value for two or more measurement axes.

5. The method of claim 1, wherein the MEMS accelerometer includes at least one measurement axis and the threshold is the same value for two or more measurement axes.

6. The method of claim 1, wherein the MEMS accelerometer includes one or more measurement axes and activity is detected if the change in acceleration is greater than or equal to the threshold for any measurement axis.

7. The method of claim 1, further comprising:
initiating a method of detecting inactivity once activity is detected, the method comprising:
using circuitry, storing an updated first acceleration value as measured by the accelerometer in the memory at a second time;
then measuring a third acceleration value using the accelerometer value at a second predetermined time, the second predetermined time later than the second time;
using circuitry, calculating a change in acceleration equal to the difference between the third acceleration value and the stored updated first acceleration value from the memory;
using circuitry, comparing the change in acceleration to an inactivity threshold;
using circuitry, determining if the change in acceleration is less than the inactivity threshold; and
if the change in acceleration is less than the inactivity threshold, using circuitry, determining if a predetermined period of time has elapsed to detect inactivity.

8. A method of detecting inactivity in a MEMS accelerometer, the method comprising:
using circuitry, storing a first acceleration value as measured by the accelerometer in a memory at a first time;
then measuring a second acceleration value at a predetermined time, the predetermined time later than the first time;
using circuitry, calculating a change in acceleration equal to the difference between the second acceleration value and the stored first acceleration value from the memory;
using circuitry, comparing the change in acceleration to a threshold;
using circuitry, determining if the change in acceleration is less than the threshold; and
if the change in acceleration is less than the threshold, using circuitry, determining if a predetermined period of time has elapsed to detect inactivity.

9. The method of claim 8, further comprising:
changing the predetermined time for measuring acceleration when inactivity is detected.

10. The method of claim 8, wherein the MEMS accelerometer includes at least one measurement axis and measuring acceleration includes measuring acceleration from one or more measurement axes.

11. The method of claim 8, wherein the MEMS accelerometer includes at least one measurement axis and the threshold is a different value for two or more measurement axes.

12. The method of claim 8, wherein the MEMS accelerometer includes at least one measurement axis and the threshold is the same value for two or more measurement axes.

13. The method of claim 8, wherein the MEMS accelerometer includes one or more measurement axes and inactivity is detected if the change in acceleration is less than the threshold for all measurement axes.

14. The method of claim 8, further comprising:
if the change in acceleration is greater than or equal to the threshold, repeating capturing, measuring, calculating and comparing until the change in acceleration is less than the threshold.

15. The method of claim 8, further comprising:
if the predetermined period of time has not elapsed, repeating measuring, calculating, comparing, and determining if the change in acceleration is less than the threshold until the predetermined period of time has elapsed or the change in acceleration is greater than or equal to the threshold.

16. The method of claim 8, further comprising
using circuitry, initiating a method of detecting activity according to claim 1 once inactivity is detected.

17. The method of claim 16 wherein the MEMS accelerometer includes at least one measurement axis and the threshold for detecting activity is a different value than the threshold for detecting inactivity for a given measurement axis.

18. A computer program product for detecting the activity or inactivity in a MEMS accelerometer, the computer program product comprising a non-transitory computer usable medium having computer readable program code encoded thereon, the computer readable program code comprising:
program code for storing a first acceleration value as measured by the accelerometer in a memory at a first time;
program code for then measuring a second acceleration value with the accelerometer at a predetermined time, the predetermined time later than the first time;
program code for calculating a change in acceleration equal to the difference between the second acceleration value and the stored first acceleration value from the memory;
program code for comparing the change in acceleration to a threshold;
program code for determining if the change in acceleration is less than the threshold, or greater than or equal to the threshold;
if the change in acceleration is greater than or equal to the threshold, detecting activity;
if the change in acceleration is less than the threshold, determining if a predetermined period of time has elapsed; and
if the predetermined period of time has elapsed, detecting inactivity.

19. The computer program product of claim 18, wherein the computer readable program code further comprises:
program code for changing the predetermined time for measuring acceleration when activity or inactivity is detected.

20. The computer program product of claim 18, wherein the computer readable program code further comprises:
program code for repeating the detecting of activity or inactivity in a MEMS accelerometer once inactivity or activity is detected.

* * * * *